(12) United States Patent
Turtinen et al.

(10) Patent No.: US 9,344,887 B2
(45) Date of Patent: May 17, 2016

(54) DIRECT COMMUNICATION AMONG DEVICES

(71) Applicant: Broadcom Corporation, Irvine, CA (US)

(72) Inventors: Samuli Turtinen, Ii (FI); Sami-Jukka Hakola, Kempele (FI); Jari Jaako Isokangas, Tampere (FI); Jussi Kustaa Ojala, Helsinki (FI); Kaisu Maria Iisakkila, Espoo (FI); Timo Kalevi Koskela, Oulu (FI)

(73) Assignee: Broadcom Corporation, Irvine, CA (US)

( * ) Notice: Subject to any disclaimer, the term of this patent is extended or adjusted under 35 U.S.C. 154(b) by 55 days.

(21) Appl. No.: 14/041,374

(22) Filed: Sep. 30, 2013

(65) Prior Publication Data

US 2014/0220936 A1 Aug. 7, 2014

(30) Foreign Application Priority Data

Oct. 2, 2012 (GB) .................................. 1217629.3

(51) Int. Cl.
*H04W 12/06* (2009.01)
*H04W 76/02* (2009.01)
(Continued)

(52) U.S. Cl.
CPC ........... *H04W 12/06* (2013.01); *H04L 63/0869* (2013.01); *H04L 67/104* (2013.01); *H04L 67/18* (2013.01); *H04L 67/22* (2013.01); *H04W 76/023* (2013.01); *H04W 8/22* (2013.01)

(58) Field of Classification Search
CPC . H04L 67/104; H04L 63/0869; H04L 63/102; H04L 63/0892; H04L 9/32; H04L 29/08306; H04L 29/08522; H04L 67/1091; H04L 63/00; H04W 8/22; H04W 12/06; H04W 76/023; H04W 76/02; H04W 92/18; H04W 8/005; H04W 12/00; H04W 12/10; H04W 76/021; H04W 98/18; H04W 52/244

USPC ............ 455/41.2, 67.11, 410–411, 418–420, 455/435.1, 456.1–456.2, 456.5–456.6, 463, 455/500, 517, 550.1, 552.1, 556.2; 370/210, 313, 328, 338, 913; 709/227–228, 238
See application file for complete search history.

(56) References Cited

U.S. PATENT DOCUMENTS 8,634,380 B2 * 1/2014 Serravalle ......... H04W 36/0066
370/331
2008/0186901 A1 8/2008 Itagaki et al.
(Continued)

FOREIGN PATENT DOCUMENTS

EP 1921873 A1 5/2008
WO 2007/044597 4/2007
(Continued)

OTHER PUBLICATIONS

3GPP TR 22.803 v1.0.0 (Aug. 2012); 3rd Generation Partnership Project; Technical Specification Group SA; Feasibility Study for Proximity Services (Release 12); Aug. 2012 (33 pages).

*Primary Examiner* — Meless Zewdu
(74) *Attorney, Agent, or Firm* — Oblon, McClelland, Maier & Neustadt, L.L.P.

(57) ABSTRACT

Method, operation of a method, and a result of execution of computer program instructions embodied on a non-transitory computer readable memory in a mobility management entity which identify, evaluate and control potential opportunities for device to device communication among two or more proximately located user equipment. The method or execution of computer instructions include, determining a context of a source user equipment and a context of a target user equipment, determining if the source and target user equipment are device to device communication compatible and determining if the source and target user equipment are authenticated for employing device to device communications. An alternative embodiment includes functionality in a base station.

19 Claims, 5 Drawing Sheets

(51) Int. Cl.
  *H04L 29/08*   (2006.01)
  *H04L 29/06*   (2006.01)
  *H04W 8/22*    (2009.01)

(56) References Cited

U.S. PATENT DOCUMENTS

| | | |
|---|---|---|
| 2010/0260101 A1 | 10/2010 | Tsirtsis et al. |
| 2011/0082940 A1 | 4/2011 | Montemurro et al. |
| 2011/0098075 A1* | 4/2011 | Bienas et al. ............... 455/517 |
| 2011/0145421 A1 | 6/2011 | Yao et al. |
| 2012/0179789 A1* | 7/2012 | Griot et al. ............... 709/220 |
| 2013/0083779 A1* | 4/2013 | Ahn et al. ............... 370/336 |
| 2013/0109301 A1* | 5/2013 | Hakola et al. ............... 455/39 |
| 2013/0336230 A1* | 12/2013 | Zou et al. ............... 370/329 |

FOREIGN PATENT DOCUMENTS

| | | |
|---|---|---|
| WO | 2010/007498 | 1/2010 |
| WO | 2011/039718 | 4/2011 |
| WO | 2011/161560 | 12/2011 |
| WO | 2012/088470 | 6/2012 |

* cited by examiner

DIRECT COMMUNICATION AMONG DEVICES

TECHNICAL FIELD

This invention relates generally to wireless communication systems, methods, devices and computer programs, and, more specifically, relates to identifying, evaluating and controlling potential opportunities for device to device communication among two or more proximately located user equipment.

BACKGROUND

Social-technical trends have resulted in a proliferation of over-the-top (OTT) applications and services such as Facebook Places, Google Latitude and Shop Kick. These proximity-based applications and services are based upon an awareness that two or more user equipment (or users) are in close proximity to one another. These applications and services typically rely upon "high-level software," employ global positioning system (GPS) technologies and networks for determining the position of each user equipment (UE) while accessing a wireless local area network (WLAN), an evolved universal telecommunications radio access network or a legacy radio access network which supply the "data pipes" for the application or service. In such a high-level software scheme, there is no network supervision of these applications and services. As such, OTT applications and services represent unregulated network traffic which utilize bandwidth, and pose security risks while offering no economic advantage from the mobile network operator's perspective.

Device-to-device (D2D) communications are contemplated as an underlay of an advanced cellular network, such as the long term evolution-advanced (LTE-A) and LTE-beyond (LTE-B) networks, as specified in the 3rd Generation Partnership Project (3GPP). In D2D communications, two or more user equipment (in close proximity) may communicate directly instead of through an evolved Node B (eNB) and evolved packet core network to offload network traffic, such as video streaming, online gaming, media downloading, and peer-to-peer (P2P) file sharing. Unlike competing technologies like Bluetooth and WiFi, D2D communication promises to provide network operators the ability to coordinate communications in licensed and unlicensed spectrum in each cell to avoid interference among devices. However, an LTE platform does not currently include functionality which would allow network supervision of over the air device discovery to intercept the above described growing demand for proximity-based packet switched applications and services.

There is a need for network-based identifying, evaluating and controlling of potential opportunities for device to device communication among two or more proximately located user equipment coupled to an E-UTRAN system and security architecture. Such network-based control would allow UE access to proximity-based packet switched applications and services while at the same time allowing cellular network operators the ability to retain control of each UE's behavior; for example, which UE can emit discovery signals, when and where, what information each UE carries and what the UEs should do once they discover each other.

The following abbreviations that may be found in the specification and/or the drawing figures are defined as follows:
3GPP $3^{rd}$ Generation Partnership Project
BS base station
D2D device-to-device
DDN downlink data notification
ECGI E-UTRAN cell global identifier
ECM EPS connection management
EPS evolved packet system
eNB evolved Node B
E-UTRAN evolved universal terrestrial radio access network
ID identification
IP Internet protocol
LTE-A Long Term Evolved-Advanced
LTE-B Long Term Evolved-Beyond
M2M machine-to-machine
ME mobile equipment
MME mobility management entity
MTC machine type communication
NAS non-access stratum
P-GW packet data network gateway
RAN radio access network
RRC radio resource control
SA service aspects
S-GW serving gateway
TA tracking area
TAU tracking area update
UE user equipment

SUMMARY

In accordance with a first aspect of the present invention, there is provided a method for use in device to device communication among two or more user equipments, the method comprising:
determining a context of a source user equipment and a context of a target user equipment;
determining if the source and target user equipment are device to device communication compatible; and
determining if the source and target user equipment are authenticated for employing device to device communications.

In accordance with a second aspect of the present invention, there is provided apparatus for use in device to device communication among two or more user equipments, the apparatus comprising a processing system which itself comprises at least one data processor and at least one computer readable memory storing at least one computer program. In this second aspect the processing system is configured to cause the apparatus to at least:
determine a context of a source user equipment and a context of a target user equipment;
determine if the source and target user equipment are device to device communication compatible; and
determine if the source and target user equipment are authenticated for employing device to device communications.

In accordance with a third aspect of the present invention, there is provided a computer readable memory storing a computer program comprising a set of instructions, which, when executed by a computerised device, causes the computerised device to carry out a method for use in device to device communication among two or more user equipments, the method comprising:
determining a context of a source user equipment and a context of a target user equipment;
determining if the source and target user equipment are device to device communication compatible; and
determining if the source and target user equipment are authenticated for employing device to device communications.

Embodiments comprise a computer program product comprising a (non-transitory) computer-readable storage medium having computer readable instructions stored thereon, the computer readable instructions being executable by a computerised device to cause the computerised device to perform a method according to the first aspect of the present invention.

Embodiments comprise apparatus including means for determining a context of a source user equipment and a context of a target user equipment, a means for determining if the source and target user equipment are device to device communication compatible and a means for determining if the source and target user equipment are authenticated for employing device to device communications, determining if the source and target user equipment are device to device communication compatible and determining if the source and target user equipment are authenticated for employing device to device communications.

Further features and advantages of the invention will become apparent from the following description of preferred embodiments of the invention, given by way of example only, which is made with reference to the accompanying drawings.

DETAILED DESCRIPTION

Embodiments of this invention provide apparatuses, methods, and computer programs that identify, evaluate and control potential opportunities for device to device (D2D) communication among (or 'between') two or more proximately located user equipment (UE). Throughout this disclosure the terms "device" and "user equipment" are used interchangeably. In some embodiments described in more detail below, core network entities, such as a serving gateway (S-GW) and mobility management entity (MME), are employed to identify, evaluate and control potential opportunities for D2D communication. In another embodiment, one or more evolved Node Bs (eNBs) are employed in addition to identify, evaluate and control the potential opportunities for D2D communication. In a further embodiment where one or more eNBs are employed, a target MME identifies and controls potential opportunities for D2D communication when the target device is in an ECM-IDLE mode. In this embodiment, the identifying information is conveyed based upon the tracking area (TA) information of the target device or the dissemination of identifying information is limited to certain eNBs in one or more TAs or the determination to disseminate the identifying information is based upon the last performed tracking area update (TAU). Moreover, this embodiment provides that a MME triggers the identification, evaluation and control of potential opportunities for D2D between a source and target device. The identity and evaluation can be in one embodiment carried out by one or more eNBs and can further be limited to one or more eNBs which are capable of coordinating D2D communications. In one non-limiting embodiment, the target MME can convey information to one or more eNBs in a Paging request message. In yet another embodiment, a target device camped on an eNB may in some scenarios identify, evaluate and control potential opportunities for device to device (D2D) communication among two or more proximately located UEs based upon radio level access with eNB.

In one non-limiting example, a target device's identification is the target UE's international mobile subscriber identifier (IMSI), mobile station integrated services digital network (MSISDN) ID, ME identity, and the like. In yet another embodiment, a target MME sends specific identifying information pertaining to the target device together with that device's E-UTRAN cell global identifier (ECGI) value to a source MME. Embodiments of the present invention allow control of a UE's access to one or more proximity-based packet switched applications or services by a core network.

Prior to describing in detail the apparatuses, methods, and computer programs suitable for carrying out the above mentioned embodiments, a description of the relevant long term evolved (LTE) system, including core network entities and related functionalities, will be provided to provide clarification of the embodiments of the present invention.

In long term evolved (LTE) systems, each UE is required upon powering on to register with a public land mobile network (PLMN) by way of a radio access network (RAN) employing an Initial Attach procedure to access an evolved universal telecommunications radio access network (E-UTRAN). LTE refers to radio access architecture as the access stratum (AS), which may include various radio access networks (RANs) such as a 4G access network, like E-UTRAN or legacy RANs, such as a 3G cellular network like a universal telecommunications radio access network (UTRAN), or a 2G cellular network like a global system for communication (GSM) Enhanced Data rates for GSM Evolution (EDGE) radio access network (GERAN).

Figure 1:
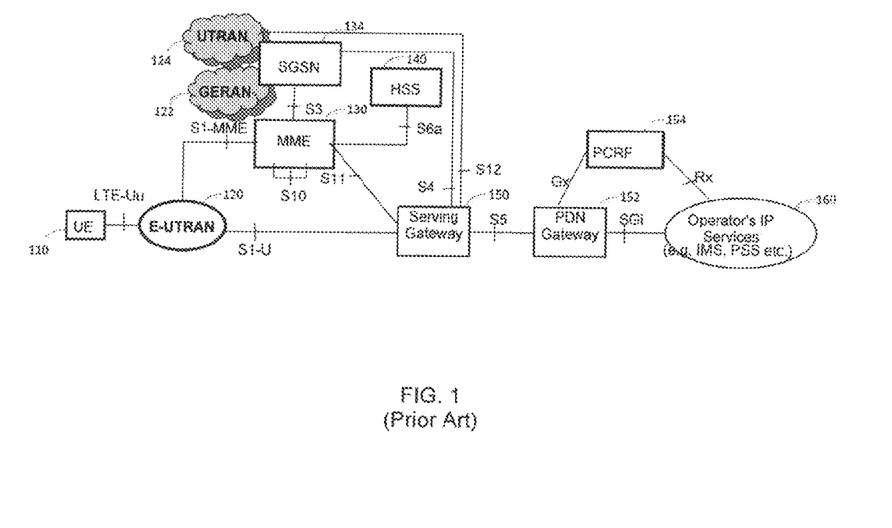
FIG. 1 reproduces FIG. 4.2.1-1 from 3GPP TS 23.23.401 (Version 11.2.0) which illustrates the non-roaming architecture for 3GPP access in accordance with the prior art.

FIG. 1 reproduces FIG. 4.2.1-1 from 3GPP TS 23.23.401 (Version 11.2.0) which shows the non-roaming architecture for 3GPP accesses 100 in accordance with the prior art. As shown in FIG. 1, UE 110 is coupled to E-UTRAN 120 via a LTE-Uu radio frequency (RF) interface for connectivity to an evolved Node B (not shown) in E-UTRAN 120. Although not shown in FIG. 1, UE 110 also has at least two other RF interfaces at its disposal, such as a Uu RF interface for connectivity between UE 110 and a Node B (not shown) and RNC (not shown) in a legacy 3G RAN (e.g., such as UTRAN 124), and a Um RF interface for connectivity between UE 110 and a base transceiver station (BTS) and a base station controller (BSC) in a legacy 2G RAN (e.g., such as GERAN 122).

Also shown in FIG. 1, various other non-access stratum (NAS) entities are shown such as a serving GPRS support node (SGSN) 134 and/or mobility management entity (MME) 130 which provide access to a core network (CN) for E-UTRAN 120, UTRAN 124 or GERAN 122. MME 130 actually may be one of many MMEs in a so-called MME pool (not shown). That is, in LTE multiple MMEs are provided for load balancing and redundancy. Each MME in the network is identified by a MME ID and a group code and one or more evolved Node Bs (eNBs) (not shown) can communicate with multiple MMEs in a pool. In FIG. 1, UE 110 can access the core network (CN) via UTRAN 124 by employing SGSN 134 together with a MME (by way of a S3 interface), thereby providing UE 110 with connectivity to the packet switched (PS) domain 160. Alternatively, UE 110 can access the CN employing GERAN 122 via SGSN 134 which is also adapted to provide connectivity to the PS domain for GERAN 122 via a Gb interface (not shown) and a S4 interface. A S1-MME interface and S1-U interface provide connectivity to the PS domain for E-UTRAN 120. Both E-UTRAN 120 and the legacy RANs access a packet data network gateway (P-GW) 152 by way of a serving gateway (S-GW) 150. As with the MMEs, multiple S-GWs and multiple P-GWs are provided in LTE and each is provided with identifying information. Again, to simplify this description, only one of each entity is shown. P-GW 152 is further adapted for employing common core network functions, such as the transfer of quality of service (QoS) policy and charging rules from a policy control and charging rule function (PCRF) 154 by way of the Gx reference point. Also, P-GW 152 allocates UE IP addresses, packet filtering, packet routing and forwarding and access to network operator's Internet protocol (IP) services 160, such as IP multimedia subsystem (IMS) and other packet switched services (PSS). A home subscriber server (HSS) 140 enables the transfer of subscription and authentication data via the S6a interface for authenticating and/authorizing user access to the evolved system which is obtained via a S6b interface from the authentication authorization accounting (AAA) server (not shown). The HSS 140 contains various subscription relevant data pertaining to users, such as international mobile subscriber identifier (IMSI), mobile station integrated services digital network (MSISDN), subscribed access point names (APN) and subscribed QoSe and so on.

As described above, in LTE the core network, or more precisely, the evolved packet core (EPC), provides each UE with IP connectivity to the P-GW, thereby allowing each device access to the Internet as well as running other IP services such as voice over IP (VOIP), IP multimedia subsystem (IMS), IP television, and IP location aware services, as well as other over-the-top (OTT) applications and services. This non-access stratum (NAS) is a functional layer (protocol layer) between EPC and the UE. NAS procedures are responsible for: selection of a mobile network, attachment to the selected network, and updating the location of the UE.

Figure 2:
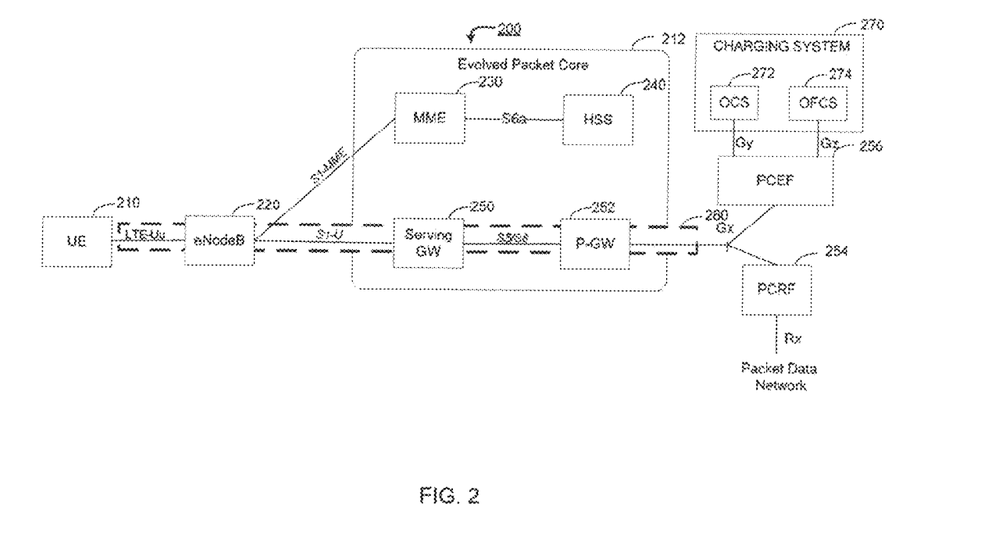
FIG. 2 shows some basic evolved packet core entities and non-access stratum functionalities including establishing a default evolved packet system bearer for handling packet switched services 200 suitable for carrying out embodiments of the present invention.

Referring now to FIG. 2, an illustration of some basic EPC entities and NAS functionalities including establishing a default EPS bearer for handling PS services 200 is shown. In FIG. 2, EPC 212 contains two functional elements in the user plane (i.e., the S-GW 250 and the P-GW 252) and one element in the control plane (i.e., MME 230). NAS signaling provides sub-layers for EPS mobility management (EMM) and EPS connection management (ECM) between the UE 210 and the MME 230 in the EPS 212. Logical connections in the control plane between UE 210 and MME 230 disregard eNB 220 (i.e., RF interface LTE Uu and S1-MME are logically combined).

The S1-MME interface is provided for logical connectivity between UE 110 via access network (E-UTRAN 120) and the non-access stratum (NAS) via MME 230 as a function of the EPC procedures. During the Initial Attach procedure, UE 220 sends an Attach request to eNB 220 which forwards that request to MME 230 via the S1-MME interface. The MME 230 creates a UE context by selecting S-GW 250 and allocating an EPS bearer identity for the default bearer associated to the UE 210. MME 230 sends an information element (IE) to S-GW 250 which includes data obtained from HSS 240, such as a temporary IMSI, MSISDN, APN, a permanent E-UTRAN cell global identifier (ECGI), as well as a PDN GW address and IP address. Thereafter, in the Initial Attach procedure, S-GW 250 creates a new entry in its EPS bearer table and sends a create default bearer request message to P-GW 252 indicated by the P-GW address received in the previous step. P-GW 252 creates a new entry in its EPS bearer context table and generates a charging ID for UE 210. PCRF 254 and the policy control enforcement function (PCEF) 256 (although shown attached to the Gx reference point) are actually located within P-GW 252. That is, PCRF 254 and PCEF 256 are functions of P-GW and are shown in FIG. 2 externally to better illustrate the creation of a dedicated bearer 280 for handling various PS services. The PCEF 256 is further coupled to a charging system 270 which includes an online charging system (OCS) 272 and an offline charging system (OFCS) 274 by way of a Gy interface and Gz interface, respectively.

Mobility management and connection management in EPC 212 is described by the EMM and ECM sub-layers in terms of numerous states in the UE and the MME. The key states are: EMM-DEREGISTERED/EMM-REGISTERED for EMM and ECM-IDLE ECM-CONNECTED in ECM. For example, UE 210 in the EMM-DEREGISTERED state is not reachable by MME 230. However, the UE context (S-TMSI) can be stored in the UE 210 and MME 230. As such, the UE 210 is in the EMM-DEREGISTERED state in MME 230. If UE 210 is in the EMM-REGISTERED state, its location is known, the accuracy of its tracking is assumed and it can have at least one active P connection (P-GW via interface S1-U and S5/S8). When UE 210 is in the ECM-IDLE state, NAS signaling does not occur between the EPC 212 and UE 210. If UE 210 enters both the EMM-REGISTERED and ECM-IDLE state, UE 210 performs the following functions: (i) it sends tracking area updates; (ii) it sends periodic tracking area updates (TAU); (iii) it sends service requests, and (iv) it responds to pages from MME 230.

Figure 3:
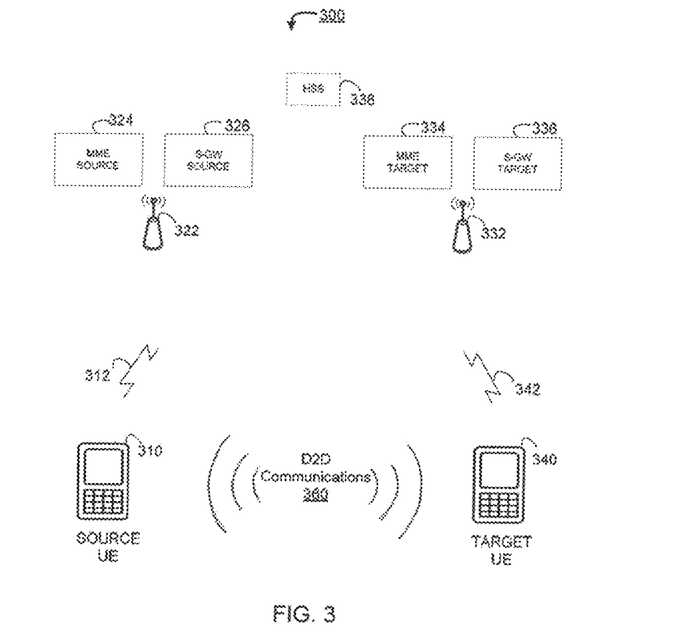
FIG. 3 shows a first non-limiting example scenario of two or more proximately located user equipment coupled to different evolved universal telecommunication access networks in accordance with embodiments of the present invention.

Referring now to FIG. 3, a first non-limiting embodiment of two or more proximately located UE is shown where each UE is coupled to a different E-UTRAN 300 in accordance with embodiments of the present invention. In FIG. 3, a source UE 310 is coupled to a first base station (BS) 322 by way of a first wireless RF interface 312. A source MME 324 and source S-GW 326 are serving the source UE 310. In one embodiment, source UE 310 and target UE 340 are both coupled to the same MME (e.g., source MME 324 or target MME 334). Target UE 340 is coupled to a target E-UTRAN 330 by way of a second wireless RF interface 342 and capable of communicating to a second BS 332. BS 322 and BS 332 can be an eNB, Node B or BTS. A target MME 334 and target S-GW 336 are serving the target UE 340. Source UE 310 and target UE 340 are both capable of D2D communication 360. In one non-limiting embodiment a packet data network gateway (P-GW), which is not shown in FIG. 3, is assumed to be able to identify that source UE 310 and target UE 340 of a certain IP flow are within its network (that is, served by itself). As such the P-GW in this non-limiting embodiment is assumed to have conveyed at least the identification of the source UE 310 (e.g., IMSI, ME Identity, MSISDN and/or the like) to target S-GW 336 which has thereafter conveyed it to target MME 334. In one non-limiting embodiment, a home subscriber server (HSS) 338 contains the pertinent identification information of target UE 340.

Figure 4:
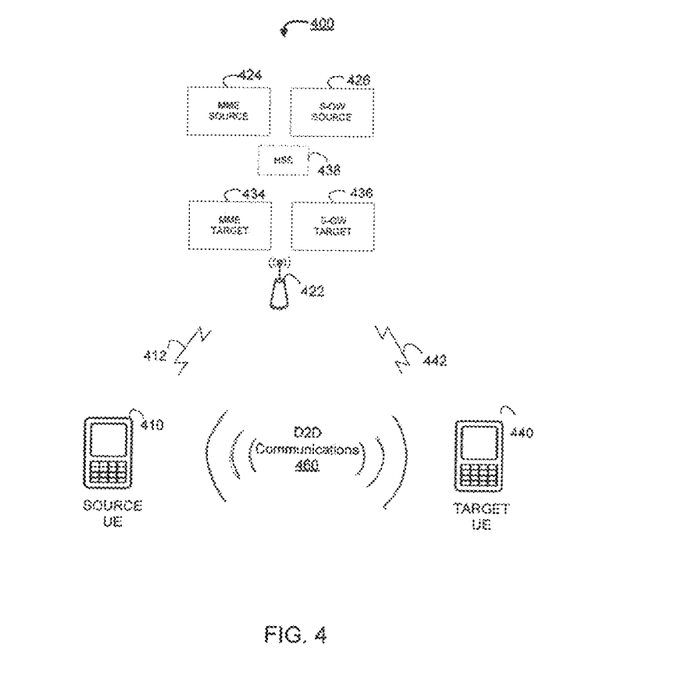
FIG. 4 shows a second non-limiting example scenario of two or more proximately located user equipment coupled to the same evolved universal telecommunications access networks in accordance with embodiments of the present invention.

Referring now to FIG. 4, a second non-limiting embodiment of two or more proximately located UE is shown where the UEs are coupled to the same E-UTRANs 400, in accordance with embodiments of the present invention. In FIG. 4, source UE 410 and target UE 440 are both coupled to the same E-UTRAN by way of a first wireless RF interface 412 and a second RF interface 442 respectively. Source UE 410 and target UE 440 are both capable of communicating with BS 422, which can be an eNB, Node B or BTS. In an alternative scenario, source UE 410 and target UE 440 can be coupled to different base stations. A source MME 424 and source S-GW 426 are serving the source UE 410. A target MME 434 and target S-GW 436 are serving the target UE 440. In one embodiment shown in FIG. 5, source UE 510 and target UE 540 are both coupled to the same MME (e.g., source MME or target MME). Source UE 410 and target UE 440 are both capable of D2D communication 460. In one non-limiting embodiment, a packet data network gateway (P-GW), which is not shown in FIG. 4, is assumed to be able to identify that source UE 410 and target UE 440 of a certain IP flow are within its network (that is, served by itself). As such, the P-GW in this non-limiting embodiment is assumed to have conveyed at least the identification of the source UE 410 (e.g., IMSI, ME Identity, MSISDN and/or the like) to target S-GW 436 which has thereafter conveyed it to target MME 434. In one non-limiting embodiment, a home subscriber server (HSS) 438 contains the pertinent identification information of target UE 440.

Figure 5:
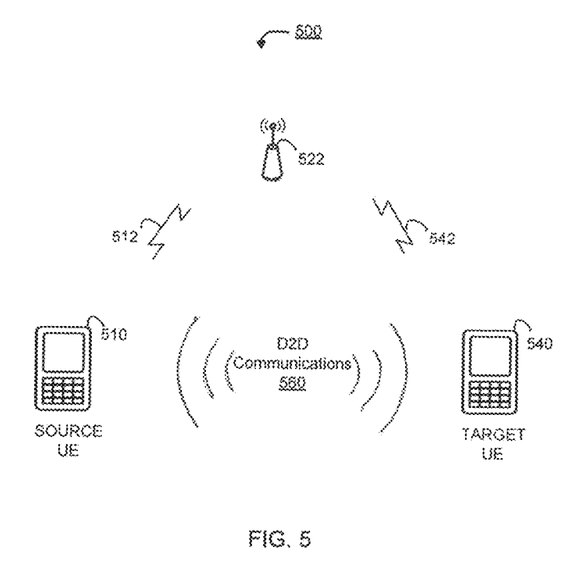
FIG. 5 shows a third non-limiting example scenario of two or more proximately located user equipment each camped on the same base station in accordance with embodiments of the present invention.

Referring now to FIG. 5, a third non-limiting embodiment of two or more proximately located UE are shown 500 camped on the same base station, in accordance with embodiments of the present invention. As shown in FIG. 5, source UE 510 and target UE 540 are both camped on the same base station 522, which can be an eNB, Node B or BTS. Source UE 510 is coupled to base station 522 by way of a first wireless RF interface 512 and target UE 540 is coupled to base station 522 via a second RF interface 542. Source UE 510 and target UE 540 are both capable of D2D communication 560. In FIG. 5, both of the devices have already participated into a D2D discovery process and target UE 540 has already obtained, for example, the link quality information measured from the discovery signal sent by source UE 510.

Figure 6:
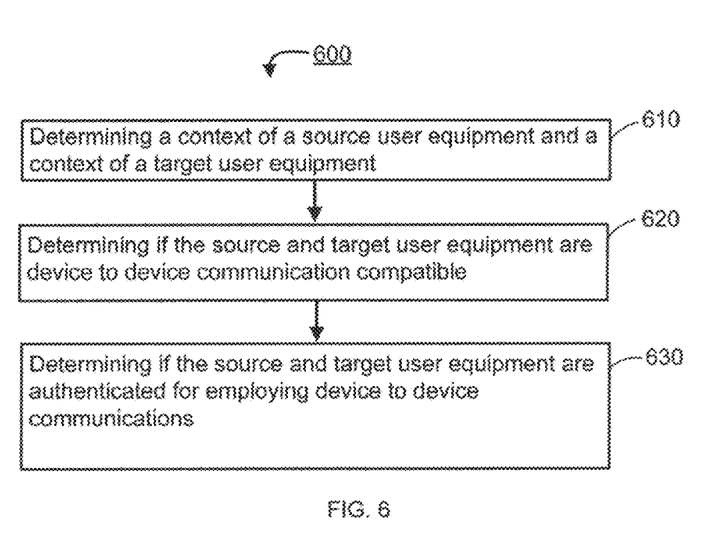
FIG. 6 shows a logical flow diagram of the operation of methods and execution of computer program instructions tangibly embodied on a computer readable memory in user equipment that identify, evaluate and control potential opportunities for device to device communication among two or more proximately located user equipment in accordance with embodiments of the present invention.

Referring now to FIG. 6, a logical flow diagram of the operation of methods and execution of computer program instructions tangibly embodied on a non-transient computer readable memory in user equipment that identify, evaluate and control potential opportunities for D2D communication among two or more proximately located UE 600 is illustrated in accordance with the present invention. In a first embodiment, a method or execution of computer program instructions cause a target mobility management entity (MME) to determine a context of a source user equipment and a context of a target user equipment (610). In one possible outcome of such a determination, a target UE and source UE might both employ the same serving MME (610). For example, referring back to FIG. 3, source UE 310 and target UE 340 actually might be assigned the same MME (source MME 324 or target MME 334) from a pool of MMEs (not shown). In some non-limiting examples, a target device's identification is the target UE's international mobile subscriber identifier (IMSI), mobile station integrated services digital network (MSISDN) ID, Mobile Equipment (ME) identifier, and the like. In yet another embodiment, a target MME sends specific identifying information pertaining to the target device together with that device's E-UTRAN cell global identifier ECGI value to a source MME. Additional method steps or results of execution of computer program instructions include: determining if the source and target user equipment are device to device communication compatible (620) and determining if the source and target user equipment are authenticated for employing device to device communications (630). In another embodiment, the target MME queries information about the source MME in a home subscriber server (HSS) and conveys the information and an ECGI of the target UE to the source MME.

In a second embodiment, in response to determining that a target MME determines that the target UE and source UE are not employing the same serving MME, a MME Identity query is sent to a home subscriber server (HSS) with the source device's identification. In one non-limiting example, the source device's identification is the source UE's international mobile subscriber identifier (IMSI), mobile station integrated services digital network (MSISDN) ID, Mobile Equipment (ME) identifier, and the like. In yet another embodiment, the target MME sends specific identifying information pertaining to the target device together with that device's E-UTRAN cell global identifier ECGI value to the source MME.

In a third embodiment, a target MME identifies, evaluates and controls potential opportunities for D2D communication when the target device is in an ECM-IDLE mode. That is, in response to determining that the ECGI of the source UE is determined to belong to one or more tracking areas (TAs) of the target device, the serving MME conveys the identifying information pertaining to the source device to each base station of the TAs of the target device. In one non-limiting example, the base station is an eNB. In an alternative non-limiting third embodiment, the identifying information includes the source UE's ECGI, a device and/or subscription identity or other identifier and the like of the source device. In yet another alternative third embodiment, the ECGI of the source device of the target device is also conveyed to each eNB of the TAs of the target device. In a further alternative third embodiment, the identifying information is conveyed to each eNB of the TA from which the target device performs the last tracking area update (TAU), and wherein the ECGI of the source device is attached. In embodiments, the MME triggers the process of identifying potential D2D communication between the source and target device. In yet a further third embodiment, the target MME conveys identifying information which pertains to the source device only to eNBs which are capable of coordinating D2D communication. In one non-limiting example, the target MME conveys the identifying information pertaining to the source device to a target device in a Paging request message. In yet another third embodiment, both of the source and target UEs have already participated into a D2D discovery process and target UE has already obtained, for example, the link quality information measured from the discovery signal sent by source UE.

The above embodiments allow controlling of a UE's access to one or more proximity-based packet switched applications or services by a core network. For example, a charging system, such as an online charging system or off line charging system, can be employed in accordance with a policy charging rule function to charge users for accessing various IP services.

Non-limiting examples of proximity-based packet switched applications or services could include: (i) proximity-based IP applications and/or services related to social applications, such as (a) exchanging files, photos, or text messages, (b) voice over LTE (LTEVoIP) conversation, (c) one-way streaming video, and (d) two-way video conferences; (ii) proximity-based IP applications and/or services related to local advertising; (iii) proximity-based IP applications and/or services related to multiplayer gaming, such as (a) high resolution media (voice & video) exchanged interactively either with all participants or team members within a game environment; (b) gaming adapted for providing control inputs based upon expected data to be received by all game participants with an ability to maintain causality; (v) proximity-based IP applications and/or services related to network offloading of traffic, which could provide an opportunistic proximity offload when such a potential exists. For example, Device 1 initiates a transfer of the media flow from the macro network to a proximity communications session with Device 2. Such an off loading of network traffic could conserve macro network resources while maintaining the quality of user experience for the media session; (iv) proximity-based IP applications and/or services related to smart meters, which includes monitoring communication among low capability machine-type-communication (MTC) devices, vehicular communication (safety and non-safety) or general machine to machine (M2M) communication among capability different devices or machines; and (vi) proximity-based IP applications and/or services related to public safety for both network controlled D2D and ad hoc D2D with partial coverage or without network coverage as envisioned by First Responder Network Authority (FirstNet).

Figure 7:
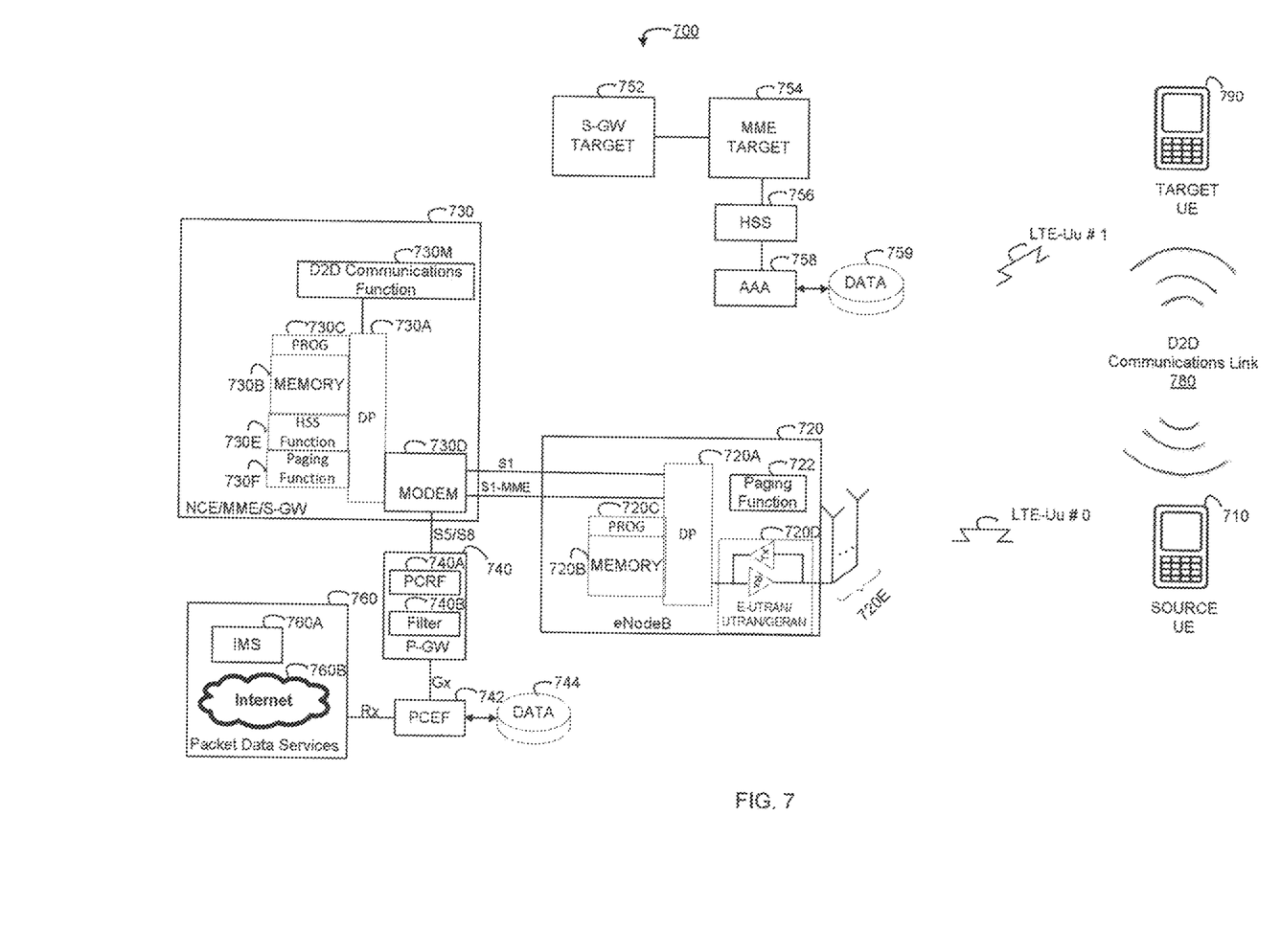
FIG. 7 is a simplified block diagram of various electronic devices and apparatuses that are suitable for use in practicing embodiments of the present invention.

Reference is now made to FIG. 7, which shows an example of a simplified block diagram of various electronic devices and apparatuses that are suitable for use in practicing embodiments of this invention. In FIG. 7, a first access node 720 is adapted for communication over a wireless link LTE-Uu #0 with a source mobile apparatus, such as a source mobile terminal or source user equipment UE 710. In additional embodiments of this invention UE 710 is adapted for device to device communication over a D2D communication link 780 with a proximity-located UE such as target UE 790. Source UE 710 and/or target UE 790 may comprise a mobile phone, smart phone, laptop computer or tablet computer or the like. The first access node 720 may be a legacy base station, such as a base station, a base station terminal (BTS), a Node B, a macro eNB, a WLAN AP, a femto eNB, or other type of base station (BS) or access point (AP) suitable for supporting E-UTRAN.

The first access node 720 includes a processing system and/or processor, such as at least one data processor (DP) 720A, and a storage device, such as at least one computer-readable memory (MEMORY) 720B, which stores at least one computer program (PROG) 720C. The first access node 720 also includes a communicating device, such as a long term evolution/long term evolution advanced (LTE/LTE-A) transceiver 720D, which includes a transmitter TX and a receiver RX for bidirectional wireless communications with the UE 710 via one or more antennas 720E. The LTE/LTE-A transceiver 720D can be any other transceiver capable of communicating with a universal mobile telecommunications system, an evolved universal mobile telecommunications Terrestrial Radio Access Network (E-UTRAN), a Global System for Mobile communications (GSM), a Universal Terrestrial Radio Access network (UTRAN), or cellular networks employing Wideband Code Division Multiple Access (WCDMA) or High Speed Packet Access (HSPA). First access node 720 also includes at least one of the PROGs 720C to carry out the above described methods and computer program operations in accordance with one or more embodiments of the present invention. For example, a Paging function 722 is included in first access node adapted to convey information to source UE 710 regarding D2D communications.

Also as shown in FIG. 7 are data interfaces S1 and control interface S1-MEE which are coupled to the first access node 720 with network core element/mobility management entity/service gateway NCE/MME/S-GW 730.

NCE/MME/S-GW 730 includes a processing system and/or processor (such as at least one data processor (DP) 730A), a storage device, (such as at least one computer-readable memory (MEMORY) 730B which stores at least one computer program (PROG) 730C, and a communicating device, such as a modem 730D for bidirectional communication with the first access node 720 via the links S1 and S1-MME. In addition, the NCE/MME/S-GW 730 is coupled to a packet data network gateway (P-GW) 740 via interfaces S5/S8. As shown in NCE/MME/S-GW 730 a HSS Function 730E is configured for carrying out one or more of the above embodiments of the present invention, such as obtaining a target device's identification stored in HSS 756 which accesses an authentication authorization accounting (AAA) server 758 to obtain data 759 which includes target UE 740 international mobile subscriber identifier (IMSI), mobile station integrated services digital network (MSISDN) ID, MME ID, and the like. NCE/MME/S-GW 730 also includes a Paging function 730F configured for carrying out one or more of the above embodiments of the present invention, such as sending specific identifying information pertaining to target UE 740, together with that device's E-UTRAN cell global identifier ECGI value to a source MME. Also included is a D2D communication function which includes various methods of determining whether to allow D2D communications.

P-GW 740 includes a PCRF 740A, as described above, in furtherance of the above described embodiments of the present invention. Also, P-GW 740 includes an IP filter 740B for determining the IP flow required for data services. P-GW 740 is coupled to PCEF 742 via logical reference point Gx. Alternatively, UE 710 can be configured to include an IP filter (not shown) to provide similar functionality. As shown in FIG. 7, PCEF 742 is coupled to packet data services 760. Packet data services 760 include IMS 760A and the Internet 760B as non-limiting examples of such services.

FIG. 7 also includes a target serving gateway (S-GW) 752 and target mobility management entity (MME) 754 which are coupled to target user equipment 790 which is camped on first access node 720 over wireless link LTE-Uu #1. In the scenario shown in FIG. 7, target MME 754 is the same MME employed by source UE 710. In another scenario, both target UE 790 and source UE 710 might both be camped on different eNBs (not shown). However, each eNB might be coupled to one or more MMEs in a MME pool (not shown). In other words, both eNBs share one or more of the same MME in the MME pool. In another possible scenario, source UE 710 is not attached to target MME 754 but instead is attached to an MME (not shown) which is affiliated with target UE 790 (e.g., not in the same MME pool). In yet another scenario, either source UE 710 or target UE 790 is camped on a different eNB (not shown) where that eNB is either affiliated with target MME 754 or an unaffiliated MME.

Embodiments of this invention may be implemented at least in part by computer software stored on the MEM 730B and MEMORY 720B which is executable by the DP 720A, DP 730A of the access node 720 or NCE/MME/S-GW 730 and/or UE 710, or by hardware, or by a combination of tangibly stored software and hardware (and tangibly stored firmware). Electronic devices implementing these aspects of the invention need not be the entire devices as depicted in FIG. 7, but embodiments may be implemented by one or more components of the same, such as the above-described tangibly stored software, hardware, firmware and DP, or a system on a chip (SOC) or an application specific integrated circuit (ASIC).

Various embodiments of the computer readable MEMs 710B, 720B, 730B include any data storage technology type which is suitable to the local technical environment, including, but not limited to, semiconductor based memory devices, magnetic memory devices and systems, optical memory devices and systems, fixed memory, removable memory, disc memory, flash memory, DRAM, SRAM, EEPROM and the like. Various embodiments of the DPs 710A, 720A and 730A include, but are not limited to, general purpose computers, special purpose computers, microprocessors, digital signal processors (DSPs) and multi-core processors.

As used in this application, the term 'circuitry' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of the term in this application, including in any claims. As a further example, as used in this application, the term "circuitry" would also cover an implementation of merely a processor (or multiple processors) or portion of a processor and its (or their) accompanying software and/or firmware. The term "circuitry" also would cover, if applicable to the particular claim element, a baseband integrated circuit or applications processor integrated circuit for a mobile phone or a similar integrated circuit in server, a cellular network device, or other network device.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

We claim:

1. A method for use in device to device communication among two or more user equipments, the method comprising:
   determining a context of a source user equipment and a context of a target user equipment;
   determining if the source and target user equipment are device to device communication compatible;
   determining if the source and target user equipment are authenticated for employing device to device communications;
   querying, by a target mobility management entity, information corresponding to a source mobility management entity in a home subscriber server;
   conveying, by the target mobility management entity, information corresponding to the target user equipment and an evolved universal telecommunications access network cell global identifier of the target user equipment to the source mobility management entity; and
   conveying identifying information corresponding to the source user equipment to each base station of one or more tracking areas of the target user equipment in response to determining that an evolved universal telecommunications access network cell global identifier of the source user equipment belongs to the one or more tracking areas of the target user equipment.

2. The method according to claim 1, wherein the target mobility management entity determines if the source and target user equipment are device to device communication compatible and authenticated for employing device to device communications.

3. The method according to claim 1, wherein the information corresponding to the source user equipment comprises at least one of:
   a source user equipment international mobile subscriber identifier;
   a source user equipment mobile station integrated services digital network identifier; or
   a source user equipment mobile equipment identifier.

4. The method according to claim 1, wherein the information obtained from querying the home subscriber server comprises a source user equipment mobility management entity identifier.

5. The method according to claim 1, wherein the source mobility management entity determines if the source and target user equipment are device to device communication compatible and authenticated for employing device to device communications.

6. The method according to claim 2, wherein the target mobility management entity determines if the target user equipment is device to device compatible and authenticated to use device to device communication.

7. The method according to claim 1, wherein the information corresponding to the target user equipment comprises the context of the target user equipment.

8. The method according to claim 1, wherein the target mobility management entity identifies, evaluates and controls potential opportunities for device to device communication when the target user equipment is in an evolved packet system connection management idle mode.

9. The method according to claim 1, wherein the source mobility management entity identifies, evaluates and controls potential opportunities for device to device communication when the target user equipment is in an evolved packet system connection management idle mode.

10. The method according to claim 1, wherein the information corresponding to the source user equipment is conveyed to a base station of a tracking area from which the target user equipment performed a last tracking area update.

11. The method according to claim 1, wherein a serving mobility management entity triggers a process of identifying potential device to device communication between the source user equipment and target user equipment.

12. The method according to claim 2, wherein the target mobility management entity conveys identifying information corresponding to the source user equipment only to base stations which are capable of coordinating device to device communication.

13. The method of claim 2, wherein, the target mobility management entity conveys information corresponding to the source user equipment to the target user equipment in a paging message.

14. The method according to claim 1, wherein the source user equipment and target user equipment already have participated into a device to device discovery process and the target user equipment has already obtained link quality information measured from a discovery signal sent by the source user equipment.

15. A system for use in device to device communication among two or more user equipments, the system comprising:
    circuitry configured to
        determine a context of a source user equipment and a context of a target user equipment;
        determine if the source and target user equipment are device to device communication compatible;
        determine if the source and target user equipment are authenticated for employing device to device communications;
        query information corresponding to a source mobility management entity in a home subscriber server;
        convey information corresponding to the target user equipment and an evolved universal telecommunications access network cell global identifier of the target user equipment to the source mobility management entity; and
        convey identifying information corresponding to the source user equipment to each base station of one or more tracking areas of the target user equipment in response to determining that an evolved universal telecommunications access network cell global identifier of the source user equipment belongs to the one or more tracking areas of the target user equipment.

16. The apparatus according to claim 15, wherein the system is a target mobility management entity configured to determine if the source and target user equipment are device to device communication compatible and authenticated for employing device to device communications.

17. A system comprising:
    circuitry configured to
        identify a source user equipment and a target user equipment that are device to device communication compatible;
        query information corresponding to a source mobility management entity in a home subscriber server;
        convey information corresponding to the target user equipment and an evolved universal telecommunications access network cell global identifier of the target user equipment to the source mobility management entity; and
        convey identifying information corresponding to the source user equipment to each base station of one or more tracking areas of the target user equipment in response to determining that an evolved universal telecommunications access network cell global identifier of the source user equipment belongs to the one or more tracking areas of the target user equipment.

18. The system according to claim 17, wherein the circuitry is configured to identify, evaluate and control potential opportunities for device to device communication when the target user equipment is in an evolved packet system connection management idle mode.

19. The system according to claim 17, wherein the information corresponding to the source user equipment is conveyed to a base station of a tracking area from which the target user equipment performed a last tracking area update.

* * * * *